United States Patent [19]

Nakano et al.

[11] 4,233,531
[45] Nov. 11, 1980

[54] ASSEMBLING AND ENERGIZING COMPACT MOTORS

[75] Inventors: Hideharu Nakano, Omihachiman; Shinichi Sakata, Hikone, both of Japan

[73] Assignee: Matsushita Electric Works, Ltd., Osaka, Japan

[21] Appl. No.: 929,227

[22] Filed: Jul. 31, 1978

[30] Foreign Application Priority Data

Jul. 30, 1977 [JP] Japan .................................. 52-92693
Jul. 30, 1977 [JP] Japan .................................. 52-92694

[51] Int. Cl.² .......................................... H02K 15/00
[52] U.S. Cl. ...................................... 310/42; 310/71
[58] Field of Search ....................... 310/92, 71, 89, 90, 310/50

[56] References Cited

U.S. PATENT DOCUMENTS

| | | | |
|---|---|---|---|
| 3,450,908 | 6/1969 | Mabuchi | 310/50 Y |
| 4,005,320 | 1/1977 | Mabuchi | 310/71 X |
| 4,013,907 | 3/1977 | Mabuchi | 310/71 X |

*Primary Examiner*—Donovan F. Duggan
*Attorney, Agent, or Firm*—Burns, Doane, Swecker & Mathis

[57] ABSTRACT

A device for inserting a compact motor into a limited fitting space particularly within a small rotary instrument and rotating the motor body with respect to an axis aligned with the rotary shaft of said instrument, whereby the fitting of the motor to the instrument and the electric connection for feeding power to the motor can be achieved simultaneously, comprising means for fixing the motor in the axial direction after engaged by the axial rotation of the motor body, means for preventing the axial rotation of the motor after engaged simultaneously with said engagement of the fixing means and power feeding means electrically connected after engaged simultaneously with said engagement of the fixing and preventing means, wherein the engaging elements of the respective means are provided in the respective positions of the motor and instrument which will not oppose before the axial rotation of the motor but will oppose after the rotation.

18 Claims, 21 Drawing Figures

ASSEMBLING AND ENERGIZING COMPACT MOTORS

The present invention relates to devices for fitting compact motors and feeding power to the same and more particularly to an improved device for fitting a compact motor within a housing of a small rotary instrument and connecting power feeding terminals to the motor.

Conventionally, as a method of fitting a compact motor which is a rotation activating source for small rotary instruments such as an electric shaver and hair dryer within the housing of such instruments and making a power feeding connection, there has been suggested one in which, as shown in FIG. 1, first of all, a strap 2 for fixing the motor is fixed at one end with a screw 3 to one axial end surface of the motor body 1, whereas the other end surface is opposed to the inner surface of a wall body 4 of the instrument housing, a motor coil power feeding terminal 5 projecting on said end surface is connected to a lead wire 6 from a current source within the instrument by a soldering 7 and the like and finally the strap 2 is fixed at the other end to the wall body 4 with a screw 8. There has also been suggested another method in which, as shown in FIG. 2, one axial end surface of a motor body 1' is opposed to the inner surface of the wall body 4' of the instrument housing, a power feeding terminal 5' of the motor is connected to a lead wire 6' of the instrument by a soldering 7' and the like as in the case of FIG. 1 and then a screw 8' is fastened to said end surface of the motor from the outer surface side of the wall body 4' through a hole 4" provided in the wall body 4', whereby the motor is fixed to the inner surface of the wall body. In these examples, however, as fixing screws and straps are employed, a step of fixing and fastening these parts should be taken and a further step of connecting the motor power feeding terminals to the lead wires by soldering is also necessary to take. Therefore, assembling steps of an instrument become naturally numerous. Further, in the case of FIG. 1, it is necessary to extend the fixing ends radially from the motor body to the instrument wall surface of a strap for fixing the motor and, therefore, it is also necessary to provide within the instrument housing such a space for fitting the motor as has at least a width a between the extended ends of the strap. On the other hand, in the case of FIG. 2, as screws must be fastened from outside the instrument in order to fit the motor to the inner surface of the instrument, the assembling work should be made from two directions. The screw heads exposed out of the instrument are so ugly that a decorative plate should be additionally attached for the purpose of covering such ugly fitting parts. The present invention has been suggested to remove such defects as included in the conventional methods of fitting a motor and making a power feeding connection to the same in an instrument.

Therefore, a primary object of the present invention is to provide a device enabling a motor fitting work to a small rotary instrument and a power feeding connection to be much simpler.

Another object of the present invention is to provide a device for fitting a motor and feeding power to the same which enables the number of component parts required for fitting a motor to a small rotary instrument to be reduced and, accordingly, the number of assembling steps to be remarkably reduced.

Further another object of the present invention is to provide a device for fitting a motor and feeding power to the same which enables the dimensions of a space required for fitting a motor to a small rotary instrument to be made smaller and, accordingly, the entire instrument to be minimized.

Other objects and advantages of the present invention shall be made clear upon reading the following explanation of the invention detailed with reference to certain preferred embodiments shown in accompanying drawings, in which.

Figure 3A:
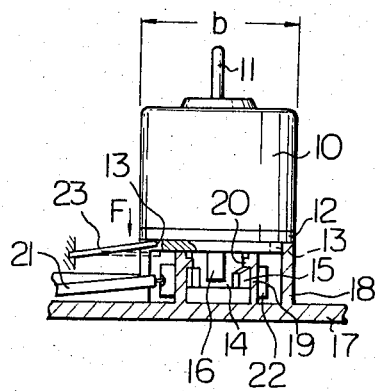
Figure 3B:
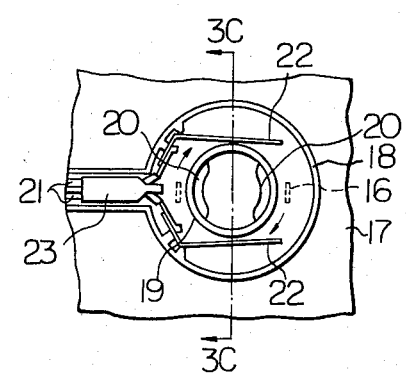
Figure 3C:
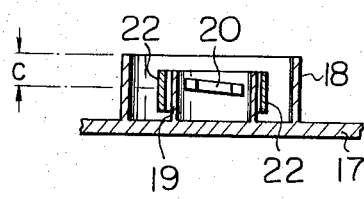
Figure 3D:
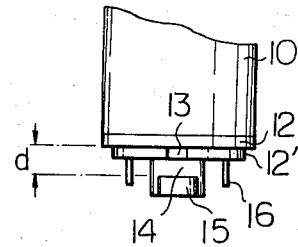
Figure 3E:
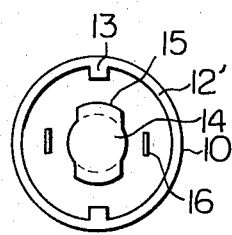
Figure 3F:
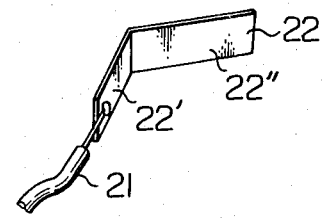

FIGS. 3A to 3F show the most preferred embodiment of a device for fitting a motor and feeding power to the same according to the present invention, FIG. 3A being a partly sectioned elevation of a motor as fitted, FIG. 3B being a plan view of respective elements on the instrument side when the motor is removed, FIG. 3C being a vertically sectioned view of the respective elements along line 3C—3C in FIG. 3B, FIG. 3D being a partly removed side view of respective elements on the motor side as seen from a different angle from the case of FIG. 3A, FIG. 3E being a bottom view of the motor, showing the respective elements on the motor side and FIG. 3F being a perspective view of a power feeding contact piece among the respective elements provided on the instrument side.

Figure 4A:
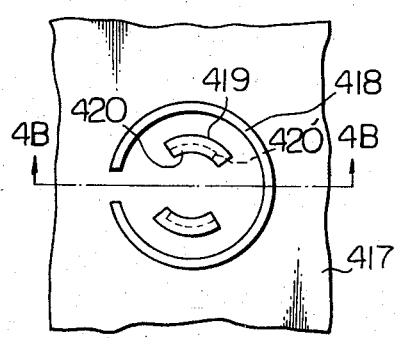
Figure 4B:
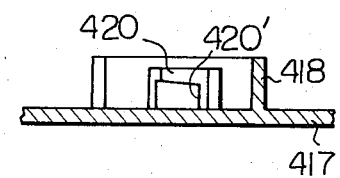
Figure 5A:
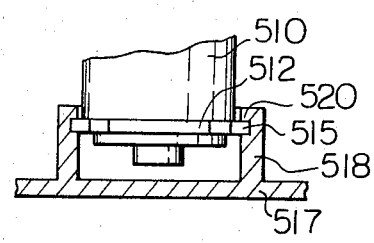
Figure 5B:
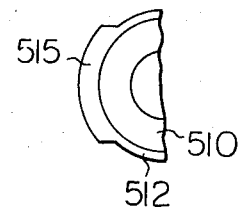
Figure 6A:
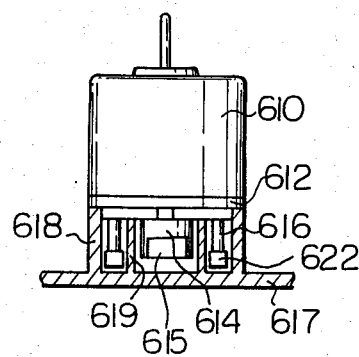
Figure 6B:
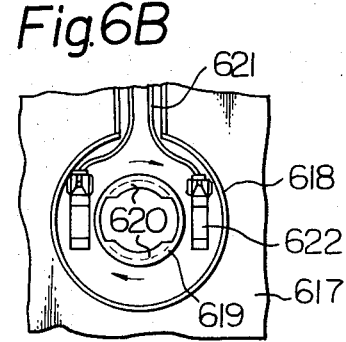
Figure 6C:
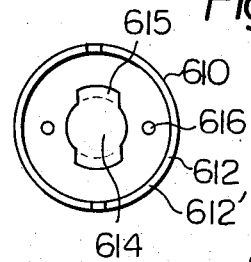
Figure 6D:
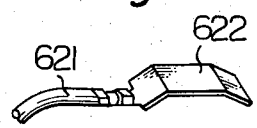
Figure 7B:
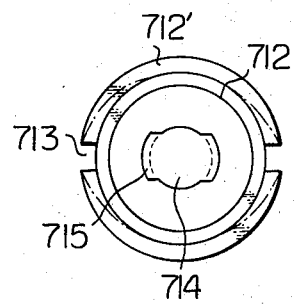
Figure 7A:
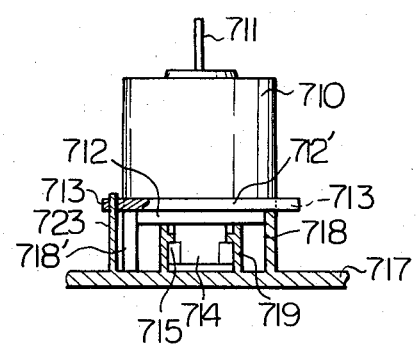
Figure 7C:
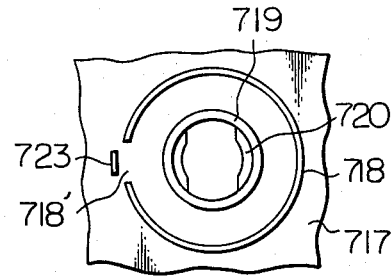
Figure 8A:
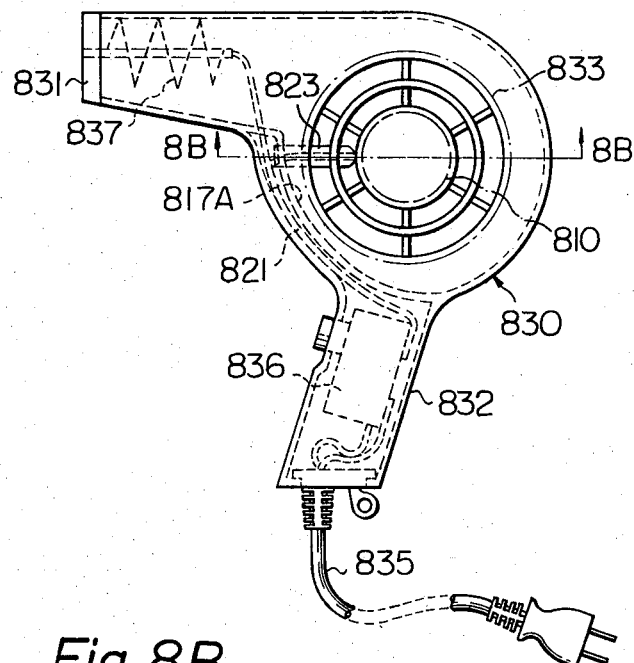
Figure 8B:
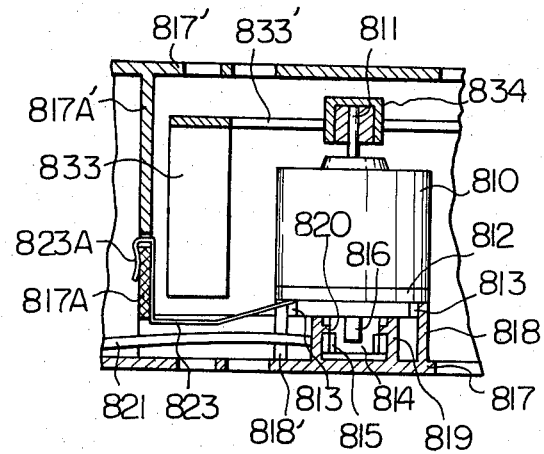

FIGS. 4A and 4B show another embodiment of fixing means on the instrument side in the device according to the present invention, FIG. 4A being a plan view and FIG. 4B being a sectioned view along line 4B—4B in FIG. 4A;

FIGS. 5A and 5B also show still another embodiment of the fixing means, FIG. 5A being a partly sectioned elevation of a motor as fitted with a part removed therefrom and FIG. 5B being a bottom view of the fixing means on the motor side with a part removed therefrom;

FIGS. 6A to 6D show another embodiment of the device of the present invention, FIG. 6A being a partly sectioned elevation of a motor as fitted, FIG. 6B being a plan view of respective fixing and power feeding means on the instrument side with the motor removed, FIG. 6C being a bottom view of the respective fixing and power feeding means on the motor side and FIG. 6D being a perspective view of a contact piece which is a power feeding element on the instrument side;

FIGS. 7A to 7C show another embodiment of a motor rotation preventing means of the device of the present invention, FIG. 7A being a partly sectioned elevation of a motor as fitted, FIG. 7B being a bottom view of the motor, showing elements on the motor side and FIG. 7C being a plan view of elements on the instrument side;

FIGS. 8A and 8B show an applied example of the device of the present invention as incorporated in a hair dryer, FIG. 8A being a side view of the hair dryer, schematically showing the internal structure and FIG. 8B being a partly sectioned view of the device of the present invention along line 8B—8B in FIG. 8A.

First of all, a preferred embodiment of the present invention shall be explained with reference to FIGS. 3A to 3F. A cylindrical motor body 10 has a rotor rotating shaft 11 projected out of one axial end surface of the motor body 10. A plastic disk 12 closing the other open end surface of the motor body 10 and supporting the inward end of the rotary shaft has a step part 12' on the peripheral edge, said step part 12' being provided with recesses 13 arranged preferably in symmetrical positions in the diametrical direction of the disk. In the center of the axial end surface of the disk, there is provided an axial columnar projecting base 14 having a pair of outward projections 15 in symmetrical positions in the diametrical direction on the peripheral surface near the tip. Outside the projecting base 14, there are provided a pair of motor power feeding terminals 16 in symmetrical positions in the diametrical direction intersecting at right angles with the diametrical direction in which the projections 15 are positioned, said terminals being connected at the inward ends to be respective ends of the motor coil and projecting in the axial direction at the outward ends. In this case, the diametrical direction in which said recesses 13 are provided coincides with the diametrical direction in which the projections 15 of the projecting base are arranged and, therefore, this coincided direction intersects at right angles with the direction in which the motor terminals 16 are arranged. This disk can be formed with a motor lid body which is also a bearing for the rotor rotating shaft.

On the wall body 17 of a housing of an instrument to which a motor is to be fitted, there are erected on the inner surface in the motor fitting position a first cylindrical receiving base 18 and a second cylindrical base 19 which is concentric with and smaller in the diameter than said first receiving base 18. The first receiving base 18 has an inner diameter which can fit the peripheral surface of the step part 12' of the disk of the motor body 10 and a height a little larger than the distance between the end surface in the axial direction of the motor of the disk 12 and the axial end surface of the projecting base 14, whereas the second receiving base 19 has such an inner diameter as enables a slidable engagement with the peripheral surface of the outward projection 15 of the projecting base 14, such an outer diameter as can be contained in the clearance between the projecting base 14 and motor terminal 16, and a height a little larger than the height of the projecting base 14 from the disk end surface. Further, the second receiving base 19 has a pair of inward projections 20 in opposing positions in the diametrical direction. The opposing distance between the respective projecions 20 is made to be of such value that they may slidably engage with the peripheral surface of the projecting base 14 of the motor body. A power feeding terminal plate 22 bent to be substantially L-shaped is connected by soldering or any other proper method to the respective ends of power feeding wires 21 arranged within the housing. The pair of terminal plates 22 are led into the space between the first receiving base 18 and second receiving base 19 through a slit arranged in the first receiving base 18. In such case, the bent part 22' connected with the power feeding wire of each terminal plate 22 is fixed to the inner surface of the first receiving base 18 by a proper method and the tip portion 22" is extended so as to resiliently contact the symmetrical position in the diametrical direction of the outer peripheral surface of the second receiving base 19. The diametrical direction in which these terminal plates 22 symmetrically contact the second receiving base 19 intersects at right angles with the diametrical direction in which said pair of inward projections 20 are opposed to each other. On the inner surface of the wall body 17, there is provided a plate spring fixed at one end by a proper method and extended at the other end so as to somewhat project inward in the neighborhood of the upper edge of the first receiving base 18 through said power feeding wire leading slit of the first receiving base 18 as the most convenient position.

When the motor is fitted to the instrument through such arrangement, the columnar projecting base 14 of the motor body 10 is inserted inside the second cylindrical receiving base 19 of the housing wall body 17 of the instrument in such a position that the outward projections 15 of the projecting base 14 may not collide with the inward projections 20 of the second receiving base 19, that is, in such a position that the motor terminals 16 intersecting at right angles with the outward projections 15 of the projecting base may face the tip of the plate spring on the wall body side as indicated by the dotted lines in FIG. 3B. Then, the step part 12' of the disk 12 on the motor side will contact the upper edge of the first receiving base 18 on the wall body side and the insertion is completed. At this time, the recesses 13 of the disk on the motor side will also intersect at right angles with the extended tip of the plate spring 23 on the wall body side and, therefore, the plate spring 23 will be pushed down onto the end surface of the disk 12 to be in resilient contact with said end surface as indicated by the dotted line in FIG. 3A.

When the motor body is then rotated along the upper edge of the receiving base 18 by about 90 degrees from said insertion place with respect to its axis, the upper edges on the motor end surface side of the projections 15 of the projecting base 14 on the motor side will engage in a sliding contact with the lower edges on the wall body side of the projections 20 of the second receiving base 19 on the wall body side opposed to said upper edges, whereby the movement of the motor in the axial direction will be prevented and the tip of the plate spring 23 on the wall body side will engage with one of the recesses 13 of the disk of the motor by its own resiliency, whereby the rotation of the motor with respect to the axis will be prevented, and further the motor terminals 16 will be inserted respectively between the outer peripheral surface of the second receiving base 19 and the respective power feeding terminal plates 22, whereby they will be pressed into contact with the respective terminal plates in said positions where the respective terminal plates are in a symmetrical contact with the outer peripheral surface of the receiving base.

Thus, the engaging position of the plate spring 23 into the recess 13, the fitting and fixing of the motor into the instrument housing can be achieved and simultaneously the electric connection of the motor terminals 16 with the current source power feeding terminals 22 can be attained. On the contrary, when the motor is removed from the instrument housing, the plate spring 23 is first pressed in the direction indicated by the arrow F in FIG. 3A so as to be free from the engagement with the recess 23 and then the motor body 10 is rotated by about 90 degrees in either direction with respect to its axis, whereby the motor side projections 15 and wall body side projections 20 will be disengaged with each other. Then, if the motor body is pulled in the axial direction, the removal of the motor will be achieved easily and simultaneously with the releasing of the electric connection.

In the above described embodiment, the respective engaging edges of the motor side projections 15 and wall body side projections 20 are preferably sloped toward the peripheral surfaces of the projecting base 14 and second receiving base 19 as shown in FIGS. 3C and 3D so that, with the axial rotation of the motor, the engaging force between the respective projections may be strengthened. However, these engaging edges may intersect at right angles respectively with the motor axis and the axis of the cylindrical receiving base. In either case, it is necessary that the distance c shown in FIG. 3C between the upper edge or extended end edge of the first receiving base 18 on the wall body side and the wall body side end edge of the inward projection of the second receiving base 19 should be substantially identical with the distance d shown in FIG. 3D between the motor side body end surface and the motor body side end edge of the outward projection 15 of the projecting base 14 which faces said motor side body end surface, in other words, the engaging body having the thickness c on the wall body side should positively engage with the engaging space having the distance d on the motor side and, thereby the axial movement of the motor should be prevented.

There has been shown an example of the plate spring 23 resiliently engaging with the recess 13 of the motor as preferable means for preventing the rotation of the motor with respect to the axis in the fitting position. However, it is not always necessary to adopt a resilient member for such preventing means. It is also possible to use such rotation preventing means as employ a rigid member, wherein, for example, a projection is provided inward the upper edge of the first receiving base 18 of the wall body so that the outward projection 15 of the projecting base of the motor and the inward projection 20 of the second receiving base of the wall body may reach the coincidence of the above mentioned distances c and d simultaneously with the engagement of the projection of the first receiving base 18 with the recess 13 of the motor.

Further, in the above described embodiment, it is desirable to provide some resiliency in the engagement with the motor side outward projection 15 by comparatively reducing at least the thickness in the direction of the extension of the receiving base of the inward projection 20 of the second receiving base on the wall body side. Variations of the structure of the current source power feeding terminal plate 22 other than is illustrated are employable, so long as the terminal plate according to a variation comes into a resilient contact with the axial rotation of the motor.

Another embodiment of the motor fixing means on the instrument housing wall body side shown in FIGS. 4A and 4B shall be described in the following. The second receiving base provided concentrically within the first receiving base 418 of a wall body 417 corresponding to the first receiving base 18 in the above described embodiment consists of a pair of arcuate parts 419 having respective inward projections 420 in the form made by removing the other peripheral wall parts than the inward projections 20 in FIG. 3B, said parts 419 having each a stopper 420' on the inner surface continued from the end of the projection 420 and to the inner surface of the wall body 417 in the extending direction of the receiving base. The projecting base and outward projections on the motor side shall employ the ones respectively referred to by the reference numerals 14 and 15 in the embodiment in FIG. 3. Therefore, if the projecting base of the motor is inserted between a pair of arcuate parts 419 of the second receiving base and the motor is rotated as in the embodiment in FIG. 3, the outward projection of the projecting base will slide along the inward projection 420 of the receiving base and contact a stopper 420' to stop further rotation of the motor. In such case, it is desirable to provide the stopper 420' on the side of the direction in which the motor body itself tends to rotate with the rotation of the rotor due to the energization of the motor. It is also desirable to slope the engaging surface of the inward projection 420 with the outward projection of the motor side projecting base so that the engaging force will be strengthened with the rotation of the motor body as indicated in the description on the embodiment in Example 3. If such desirable arrangement can be taken, the fitted motor can be prevented from loosening and the plate spring in the embodiment in FIG. 3 can be dispensed with.

In still another embodiment of the motor fixing means shown in FIGS. 5A and 5B, on the peripheral edge of a disk 512 closing one axial end of the motor body 510 and supporting the rotor shaft, there are provided a pair of outward projections 515 projecting radially at the symmetrical positions in the diametrical direction of said disk, and on the inner surface of the housing wall body 517 of the instrument to which the motor is to be fitted, there is provided a substantially cylindrical receiving base 518 corresponding to the first receiving base in the embodiment in FIG. 3. The receiving base 518 is designed to have an inside diameter a little larger than the diameter of the motor body 510 but smaller than the distance between the peripheral edges of the outward projections 515 of the motor. In the opposed positions in the diametrical direction of the end edge of the receiving base 518 extended from the wall body 517, there are formed cuts which can pass the outward projections 515 along the inner peripheral surface, said cuts communicating with an annular groove which is formed in parallel with the end edge along the inner peripheral surface in a position separated from said end edge and is defined by a projecting edge 520. The annular groove is of such dimensions as can slidably contain the outward projections 515 of the motor. Therefore, if the motor body 510 is inserted into the receiving base by fitting the outward projections 515 in said cuts on the inner peripheral surface of the receiving base 518 and rotated with respect to the axis, the projections 515 will engage with the annular groove and, thus, the axial movement of the motor will be prevented by the projecting edge 520 of the receiving base. Thus, in this embodiment, the second receiving base of the embodiment in FIG. 3 can be dispensed with. It is also possible that the receiving base 518 should be formed to have an inside diameter a little larger than the distance between the peripheral edges of the projections 515 of the motor and to provide the projecting edges 520 in the opposed positions on the inner peripheral surface along the end edge. In either case, it is desirable that at least the engaging surface of the projecting edge 520 with the projection 515 will obtain such an engaging force as will be strengthened with the rotation of the motor and it is also possible that the stopper of the embodiment in FIG. 4 should be provided in one of the directions of the peripheral surfaces of the respective projecting edges.

Another embodiment illustrated in FIGS. 6A to 6D shows particularly another type of power feeding means, but it will be explained only briefly since the means for axially fixing the motor and the means for preventing the axial rotation of the motor illustrated therein are the same as used in the embodiment in FIG.

3. A motor body 610 is provided with round and bar-shaped power feeding terminals 616 having a sufficient rigidity which project out of a disk member 612 closing one end surface in the axial direction and supporting the inward end of the rotary shaft of the motor body. Power feeding terminal plates 622 bent in a substantially shallow U shape are connected and fixed by a proper method to the tips of respective current source wires 621 which are led along the inner surface of the wall body 617 of the housing of an instrument to which the motor is to be fitted into the annular space between the cylindrical first and second receiving bases 618 and 619 errected from said inner surface. These terminal plates are fixed within said annular space by a proper method so that certain resiliency may be produced in the upright direction of the respective receiving bases, that is, in the inserting direction of an engaging projecting base 614 projected in the center of said disk 612 of the motor and thereby they can provide resilient contact surfaces on the line intersecting at right angles with the opposing direction of the inward projections 620 of the second receiving base 618. Thus, if the motor body 610 having the engaging projecting base 614 inserted in said receiving base so that its outward projections 615 will not contact the inward projections 620 of the second receiving base 619 on the wall body side is rotated with respect to the axis, the engagement of the outward projections 615 with the inward projections 620 is taken place, and simultaneously the power feeding terminals 616 of the motor will push the power feeding terminal plates 622 in said direction at their tips and come to resiliently contact said contact surfaces of the terminal plates. That is to say, these terminal plates, wherein the power feeding contact with the motor terminals is achieved by pressing these terminal plates against the inner surface of the wall body 617, can dispense with a second receiving base, as different from the case of holding the motor terminals between the terminal plates and the peripheral surface of the second receiving base in the embodiment in FIG. 3. These terminals, therefore, can be utilized, for example, in the case of the embodiment in FIG. 5.

FIGS. 7A to 7C shows particularly another embodiment of the means for preventing the motor rotation with respect to the axis, but detailed description thereon shall be omitted since the means for fixing the motor in the axial direction shown in these drawings are the same as in the embodiment in FIG. 3. The power feeding means to the motor is not illustrated, since either means of the embodiments in FIGS. 3 and 6 can be applied hereto. In this embodiment, a disk 712 arranged at the axial end of a motor body 710 has a flange 712' extending in the radial direction intersecting at right angles with the axial direction, said flange being provided with a pair of recesses 713 in alignment with the diametrical direction of the symmetrical arrangement of a pair of outward projections 715 of an engaging projecting base 714. On an instrument housing wall body 717 to which the motor is to be fitted, and outside a slit 718' for leading in current source wires arranged in the cylindrical first receiving base 718, there is provided a resilient member 723 erected from the inner surface of the wall body to a level exceeding the height of said flange 712' from the inner surface of the wall body when the motor is fitted. In this embodiment, the housing is formed of a comparatively resilient material in accordance with the thickness and the resilient member 723 is formed integrally with the wall body as a resilient plate-shaped projection in the radial direction of the receiving base 718. The resilient member can be replaced by a substantially L-shaped metal piece. In such arrangement, the motor engaging projecting base 714 is inserted into the receiving base 719 in a position in which the projections 715 of the projecting base do not collide with the inward projections 720 of the second receiving base 719 of the wall body while the resilient member 723 once deformed outward is being brought into contact with the outer periphery of the flange 712' of the motor, and the motor is rotated by 90 degrees with respect to the axis, and thereby the outward projections 715 on the motor side will be fixed to and engaged with the inward projections 720 on the wall body side to prevent the axial movement of the motor and, at the same time, the resilient member 723 will resiliently engage with one recess 713 of the flange 712' of the motor to thereby prevent the axial rotation of the motor.

The flange 712' of the motor is shown to be circular. However, if it is shaped elliptic as shown by the chain line in FIG. 7B, and if the shorter axis diameter is made to coincide with the diameter of the motor and a pair of recesses 713 are provided along the longer axis, when the projecting base of the motor is inserted into the receiving base on the wall body side, the resilient member 723 will contact the peripheral edge on the shorter axis side of the elliptic flange 712', and will engage with the recess 713 after sliding on the elliptic peripheral edge with the axial rotation of the motor. Therefore, it will not be necessary to deform once the resilient member outward at the time of inserting the projecting base of the motor, as in the case of the embodiment in FIG. 3. Also, instead of the flange extending out of the peripheral surface of the motor, a recess inward from the peripheral surface of the motor can be made in the disk 712 as in the case of the embodiment in FIG. 3, and the resilient member 723 can be so shaped as to engage with this inward recess.

Now, the structure of an applied example of the device of the present invention, in which a small rotary instrument to which a motor should be fitted is a hair dryer shall be described with reference to FIGS. 8A and 8B. As seen in FIG. 8A, a hair dryer 830 usually has a substantial L-shaped contour and contains a motor 810 having a shaft core 834 of a transverse flow fan 833 fixed on a rotary shaft 811 in a substantially circular part between an air stream outlet 831 and a grip 832. The housing of the dryer consists of two-split wall bodies 817 and 817'. The respective wires of a current source cord 835 are connected to power feeding wires 821 connected to a heater 837 within the outlet 831 and power feeding terminals 816 of the motor, through two switches for switching "ON" or "OFF" and "cool" or "hot". These power feeding wires 821 are arranged within a space partitioned with partition walls 817A and 817'A provided in the respective wall bodies of the housing. The power feeding wires to the motor are led into the space within the receiving base through a slit 818' of the first receiving base 818 on the inner surface of the wall body 817, which is motor fixing means so formed and arranged as, for example, in the case of the embodiment in FIG. 3 and further connected to power feeding terminal plates not illustrated here but shown, for example, in the embodiment in FIG. 3. A plate spring 823 for preventing the axial rotation of the motor is bent to be substantially L-shaped, folded back at one end 823A to be clip-shaped, fixed at this clip-shaped end 823A to the partition wall 817A of the wall body 817, and extended at the other end 823B to the inward and neighborhood of the end edge of the first receiving base 818 through the slit 818' of said receiving base. The wall body 817 is further provided with a second receiving base 819 arranged concentrically within the first receiving base 818 and having inward projections 820. On the other hand, the motor 810 is provided with a disk 812 having the same recesses 813 as in the case of FIG. 3, said disk being provided in the center with an engaging projecting base 814 projecting in the axial direction opposite to the rotary shaft 811 and having outward projections 815 on the peripheral edge as in the case of FIG. 3. The fan 833 fixed to the rotary shaft 811 as described above is integrated with the shaft core 834 through a plurality of radial arms 833' and these arms are opened therebetween, which permits easy access to the motor 810 through between the arms.

In the state that a half part 817' of the wall body is removed, a motor 810 having a fan fixed thereto is inserted in the same manner as in the case of FIG. 3 that the projecting base 814 is engaged with the second receiving base 819 on the wall body 817 and further into the respective receiving bases 818 and 819 more deeply against the force of the plate spring 823 to be in contact with the end surface of the disk and, then, rotated by about 90 degrees with respect to the axis. Thereby the outward projections 815 on the motor side will engage with the inward projections 820 on the wall body side, the motor terminal 816 will engage in contact with the power feeding terminal plate (not illustrated), and at the same time, the plate spring 823 will engage in the end part 823B with the recess 813 of the motor and thus the fitting of the motor to the wall body 817 and the power feeding connection will be simultaneously attained. In this state, the fan 833 is rotatably arranged in the space between the motor and partition wall. Then the other half part 817' of the wall body is crowned and connected to the half part 817 to complete the assembling of the hair dryer. In order to remove the motor for a repair or the like, after the half part 817' of the wall body is removed from the other half part 817, the plate spring 823 is pushed down near the tip part 823B toward the wall body 817 by the tip of a driver or the like inserted between the arms of the fan, and the motor body is gripped with the finger tips of human beings also through between the arms of the fan. Next, the motor is rotated by about 90 degrees in either direction with respect to the axis to disengage the fixing means and to release the contact of the power feeding means and then pulled up. The assembly of the motor and fan may be easily removed.

As described above, according to the present invention, wherein the engagement and electric contact can be obtained by moving the motor in the axial direction and rotating it with respect to the axis, respective elements of respective means for fitting and fixing a motor and preventing its rotation and for feeding power to the motor are provided in the motor as well as the housing of an instrument to which the motor is to be fitted. Therefore, the motor fitting plates, screws for fixing the plates to the motor and housing and the soldering work of the power feeding wires to the motor terminals as have all been conventionally required can be dispensed with in the present invention. Consequently, the parts and steps required for assembling of the instrument are greatly reduced in number and further, the assembly becomes much easier, which results in a great reduction of the manufacturing cost.

In the example of the hair dryer shown in FIG. 8, as the motor fitting and power feeding connection can be made within the range of the end surface in the direction of the rotary axis of the rotor, the space for fitting and power feeding connection can be minimized, so that the effective opening area of the suction port may be secured very widely.

Figure 1:
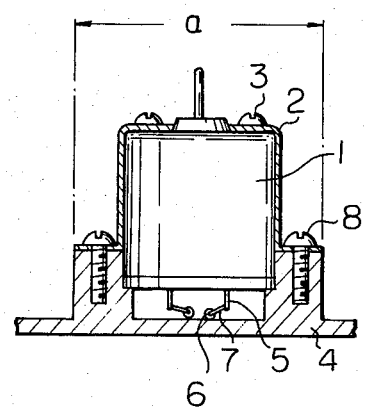
FIG. 1 is a partly sectioned elevation of a motor as fitted, showing an example of a conventional device for fitting a motor to a small rotary instrument or the like and feeding power to the same.
Figure 2:
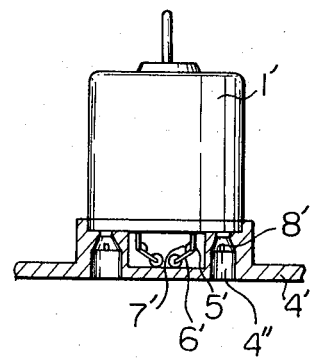
FIG. 2 is also a partly sectioned elevation, showing another example of the conventional device.

Particularly, according to the present invention wherein the elements required for the respective means for fitting and fixing a motor and preventing the rotation of the motor and means for a power feeding connection are all arranged substantially within the range of the end surface in the axial direction of the motor which is of the width b shown by the chain lines in FIG. 3A, and the fitting and power feeding connection can be attained by the movement and rotation of the motor within the range of the area of said end surface, it is possible that the motor fitting and power feeding connection can be made within a smaller range compared to the conventional range of the width a shown by the chain lines in FIG. 1 which is larger than the diameter of the end surface of the motor and, consequently, the space for fitting the motor in the housing of a small rotary instrument into which the motor is to be incorporated can be made smaller and the instrument itself can also be minimized if necessary.

What is claimed is:

1. A device for simultaneously achieving a mechanical engagement of a motor with a housing of an instrument for containing said motor to utilize its rotation output and an electric connection for feeding power to the motor, comprising power feeding means consisting of a pair of motor input terminals connected to an exciting coil of the motor and projected at one end out of the motor body and a pair of current source power feeding terminals fixed engageably in contact with said motor input terminals in the positions on the inner surface of the housing to which the motor should be fitted and connected to power feeding wires, means for fixing a motor in the direction of projecting motor power feeding terminals consisting of a first engaging element on the motor side for defining a first distance along the projecting direction of said motor input terminals at least on the same surface of the motor out of which said motor input terminals project and a first engaging element on the housing side arranged on the inner surface of the housing adjacent said current source power feeding terminal, and engageable with said first engaging element on the motor side for defining a second distance of substantially the same value as said first distance in the same direction as said first distance, and means for preventing rotations of the motor in said rectangularly intersecting direction consisting of a second engaging element on the motor side having at least one engaging surface extending at least in the direction of intersecting at right angles with the projecting drection of said motor input terminals at least on the same surface of the motor out of which said motor input terminals project and a second engaging element on the housing side engageably arranged on the engaging surface with said second engaging element on the motor side, wherein the terminals and engaging elements on the motor and housing sides of said power feeding, fixing and rotation preventing means are brought into an engageable relation with each other by the movement of the motor fitting position of said housing in the direction of projecting the motor input terminals.

2. A device according to claim 1 wherein said direction of projecting the motor input terminals aligns with the axis of the motor rotary shaft and said rotating direction intersecting at right angles with said projecting direction aligns with the direction of the peripheral surface of the motor body.

3. A device according to claim 2 wherein the motor input terminals of said power feeding means are rigid conductive members projecting substantially parallelly on one end surface in said axial direction of the cylindrical motor body, in symmetrical positions with respect to the axis in the diameterical direction of said end surface, the first engaging elements on the motor side of said motor fixing means are a pair of engaging members arranged symmetrically in alignment with the diametrical direction in which said conductive members are positioned and having two engaging surfaces parallel with the motor end surface and separated mutually by said first distance in the axial direction of the motor respectively from said motor end surface, the engaging surface of the second engaging element on the motor side of said motor rotation preventing means intersects at right angles with the direction of the peripheral surface of said cylindrical motor in at least one of the directions intersecting substantially at right angles with said diametrical direction in which said pair of input terminals and engaging members are arranged, the current source power feeding terminals on the housing side of said power feeding means are a pair of resilient conductive members each fixed at one end to the inner surface of the housing and extended at the other end to the opposing positions in which each of said pair of motor input terminals can resiliently engage in contact with the motor movement to said fitting position and its rotation, the first engaging elements on the housing side of said motor fixing means are a pair of engaging members erected from the inner surface of said housing in the symmetrical positions intersecting at right angles with the direction connecting the opposing positions of said pair of power feeding terminals on the housing side and each having two engaging surfaces parallel with the inner surface of the housing and separated from each other by said second distance in the erecting direction, the second engaging element on the housing side of said motor rotation preventing means is at least one member fixed at one end to the inner surface of the housing, and extended at the other end to the position in which it can engage with the engaging surface of said second engaging element on the motor side with the movement and rotation of said motor on the line connecting the symmetrical positions of the pair of housing side engaging members of said motor fixing means, the movement of said motor is carried out by carrying said end surface of the motor into an engageable relation in the axial direction in a state that the diametrical direction in which said pair of input terminals are symmetrically disposed is substantially aligned with the line in which said first and second engaging members on the housing side are disposed and said rotation of the motor is carried out by sliding the motor by about 90 degrees in one peripheral direction with respect to the axis from said engageable position.

4. A device according to claim 3 wherein the engaging surface on the side nearer to the housing of the respective two engaging surfaces of said first engaging elements of the motor and housing is sloped in such direction as the engagement with each other will be strengthened with the rotation of said motor.

5. A device according to claim 3 wherein said end surface of the motor is an end surface opposed to the end surface through which the rotary shaft of the motor projects.

6. A device according to claim 4 wherein said motor side input terminals and first and second engaging elements are provided respectively on the outer surface of a member supporting the rotary shaft of the motor on the inner surface in said end surface of the motor.

7. A device according to claim 6 wherein said motor side input terminals and respective engaging elements are formed integral with said rotary shaft supporting member.

8. A device according to claim 3 wherein one of said two engaging surfaces of the pair of the first engaging members on the motor side of said motor fixing means is the end surface of the motor and the other is the surface opposed to said motor end surface of the outward projection which extends in the peripheral direction of the motor along said diametrical direction from the member projecting from said end surface in the axial direction of the motor, has said first distance between said motor end surface and itself and defines a space opened in the peripheral direction whereas said two engaging surfaces of the pair of the first engaging members on the housing side are both surfaces of the inward projections which extend in the opposing directions from the first engaging member erected from the inner surface of the housing, and has the thickness of said second distance in the erecting direction capable of fitting in the space defined by said outward projections of the first engaging member on the motor side.

9. A device according to claim 3 wherein said pair of the first engaging members on the motor side of said motor fixing means are respectively peripheral projections projecting substantially at right angles with the peripheral surface of the motor from said motor end surface and said two engaging surfaces of said pair of the first engaging members on the housing side are respectively both surfaces opposed to the upright directions of recesses arranged to intersect at right angles with the upright directions in the neighborhood of the tips of said members erected from the inner surface of the housing.

10. A device according to claim 8 wherein said member projecting from the end surface of the motor in the axial direction of the motor is a projecting base arranged substantially in the center of said end surface of the motor and said outward projections are arranged on the peripheral surface of said projecting base.

11. A device according to claim 3 wherein said first engaging member on the motor side are a pair of outward projections arranged on the peripheral surface of a substantially columnar projecting base formed integrally substantially in the center of the outer surface of a member supporting the inward end of said rotary shaft on the inner surface in the end surface of the motor opposite to the end surface through which the rotary shaft of the motor projects, one of said two engaging surfaces is the outer surface of said rotary shaft supporting member while the other is each surface opposed to said outer surface of said outward projection, one of said two engaging surfaces of said first engaging members on the housing side is the end edge of the first cylindrical receiving base which has substantially the same outside diameter as the diameter of said cylindrical motor body and is engageable with the outer surface of said motor rotating shaft supporting member, while the other is the surface opposed to each inner surface of the housing of the pair of the inward projections opposed to the inner peripheral surface of the second cylindrical receiving base arranged concentrically within said first receiving base, and the inside diameter of said second cylindrical receiving base is of such value as can slidably contain said columnar projecting base on the motor side.

12. A device according to claim 11 wherein the power feeding terminals on the housing side of said power feeding means are arranged in the annular space between said first and second receiving bases.

13. A device according to claim 12 wherein the other extended end of said housing side power feeding terminal is resiliently pressed against the outer peripheral surface of said second receiving base and the input terminal of said motor is made engageable in contact with the input terminal of the motor between the other extended end of said housing side power feeding terminal and the outer peripheral surface of the second receiving base.

14. A device according to claim 12 wherein the other extended ends of said housing side power feeding terminals are arranged with a resiliency in the separating direction from the inner surface of the housing and the input terminals of said motor are engaged in contact at the extended ends with the other extended ends of said housing side power feeding terminals pressing resiliently against the inner surface of the housing.

15. A device according to claim 3 wherein said second engaging element on the housing side is a resilient member having said other extended end extended substantially parallelly with the inner surface of the housing, said second engaging element on the motor side is recesses provided on the peripheral edge of the end surface of the motor and the other extended end of said resilient member is made to resiliently engage with said recesses in the axial direction of the motor.

16. A device according to claim 3 wherein the second engaging element on the housing side of said motor rotation preventing means is a resilient member having said other extended end extended from the inner surface of the housing in the upright direction, and the engaging element on the motor side is recesses provided on the peripheral edge of the end surface of the motor, said extended end of said resilient member being made to resiliently engage with said recesses in the direction intersecting at right angles with the axis of the motor.

17. A device for simultaneously achieving a mechanical engagement of a motor with a housing of an instrument for containing said motor to utilize its rotation output and an electric connection for feeding power to the motor, comprising
power feeding means consisting of motor input terminals projected out of the motor body and current source power feeding terminals fixed engageably in contact with said motor input terminals in the positions on the inner surface of the housing to which the motor is to be fitted,
means for fixing a motor in the direction of projecting motor power feeding terminals consisting of a first engaging element on the motor side having an engaging surface extended at least from the same surface of the motor out of which said motor input terminals project and facing the surface of the motor so as to define a space with a distance from said motor surface and a first engaging element on the housing side which is extended from the inner surface side of the housing and fill said space in the extending direction by that when the extended end surface contacts said surface of the motor, the other engaging surface facing the housing side will contact the engaging surface of said first engaging element on the motor side, and
means for preventing rotations of the motor in said rectangularly intersecting direction consisting of a second engaging element on the motor side having at least one engaging surface extending at least in the direction of intersecting at right angles with the projecting direction of said motor input terminals at least on the same surface of the motor out of which said motor input terminals project and a second engaging element on the housing side engageably arranged on the engaging surface with said second engaging element on the motor side,
wherein the terminals and engaging elements on the motor and housing sides of said power feeding, fixing and rotation preventing means are brought into an engageable relation with each other by the movement of the motor to the motor fitting position of said housing in the direction of projecting the motor input terminals.

18. A compact rotary instrument comprising a housing to be opened and closed with a lid at least in one direction, a substantially cylindrical motor contained within said housing and fitted in a position facing said lid, switching means contained in said housing to switch ON or OFF an electric power at least to said motor, a current source cord connected to said switching means and led out of the housing, at least one loading means contained in said housing, said loading means being connected to the output terminal of a rotary shaft of said motor, power feeding wires each connected at one end to said switching means and at the other end at least to said motor, and means for fitting said motor to the housing, and simultaneously connecting said motor to said feeding wires,
said motor fitting, power feeding and connecting means consisting of an engaging element provided on one axial end surface of the motor, a pair of input terminals projected in the axial direction from the end surfaces symmetrically in the diametrical direction of said motor end surface, an engaging element provided on the inner surface facing said lid of the housing and resilient power feeding terminals each connected at one end to said power feeding wire and arranged at the other end to oppose to the other,
said motor engaging element consisting of a pair of outward projections extended to intersect at right angles with the motor axis and arranged symmetrically in the diametrical direction of said motor end surface which intersects at right angles with the diametrical direction of said pair of input terminals and a pair of recesses provided in the positions aligned with the diametrical direction of said outward projections, said housing engaging element consisting of a pair of inward projections arranged to oppose to each other in the symmetrical positions with respect to the opposing center of said pair of power feeding terminals on the line passing through said opposed center and intersecting at right angles with said opposing direction and at least one member which enables the extended end from the inner surface of the housing with at least one of said pair of recesses of the motor on the line intersecting at right angles with said inward projections and said engaging elements and terminals of the motor and housing being so arranged as to approach mutually when the motor is inserted into the housing from which the lid is removed with the end surface of the motor directed toward the inner surface of the housing so that the respective arranging directions of the outward projections of the motor and the inward projections of the housing intersect at right angles with each other, and then the motor is rotated by about 90 degrees in one of the peripheral directions, whereby the outward projections of the motor will engage with the inward projections of the housing, the engaging member of the housing will engage with the recesses of the motor, the movements of the motor, in the axial and peripheral directions will be prevented, thus the motor will be fitted to the housing and, at the same time, the input terminals of the motor will engage in contact with the power feeding terminals of the housing.

* * * * *